May 2, 1961 B. L. STEIERMAN 2,981,975
APPARATUS FOR SHAPING CYLINDRICAL STOCK
Filed Nov. 25, 1958 2 Sheets-Sheet 1
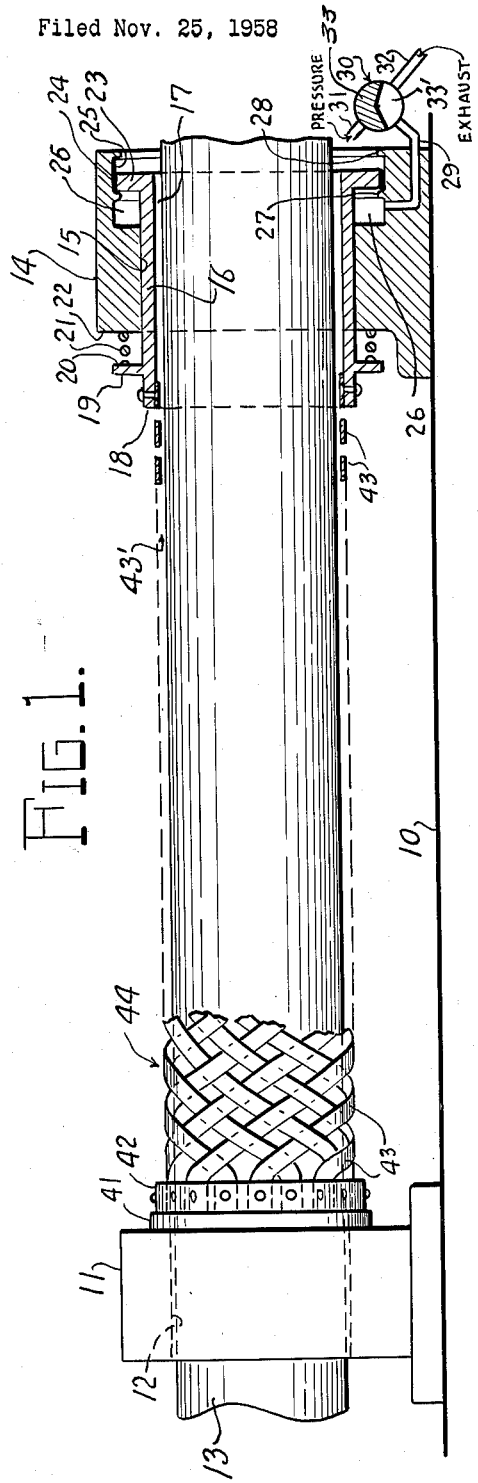
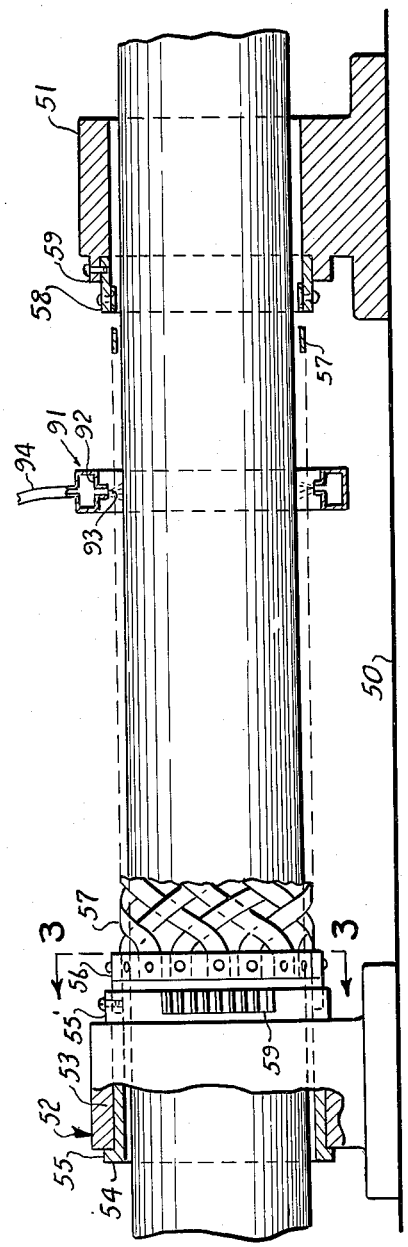
INVENTOR.
Bernard L. Steierman
BY
W. A. Schaich
Leonard D. Soubier
ATTORNEYS May 2, 1961  B. L. STEIERMAN  2,981,975
APPARATUS FOR SHAPING CYLINDRICAL STOCK
Filed Nov. 25, 1958  2 Sheets-Sheet 2
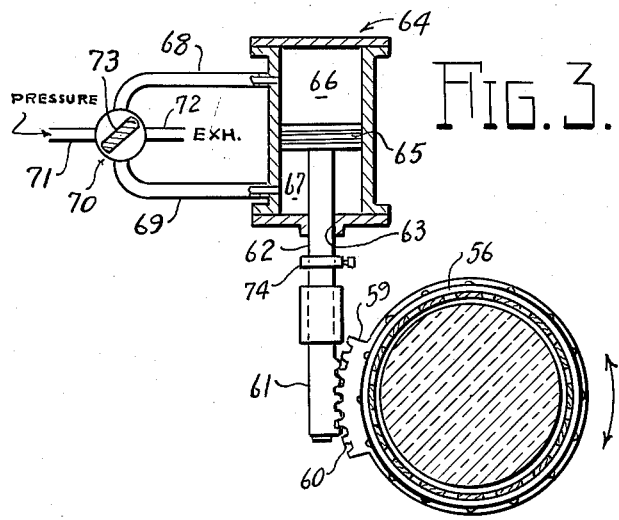
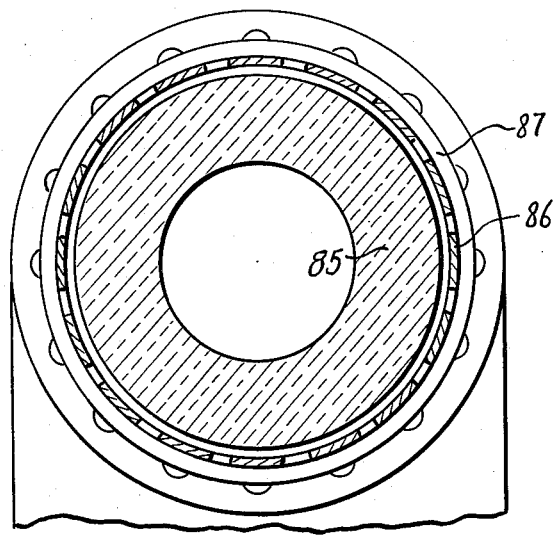
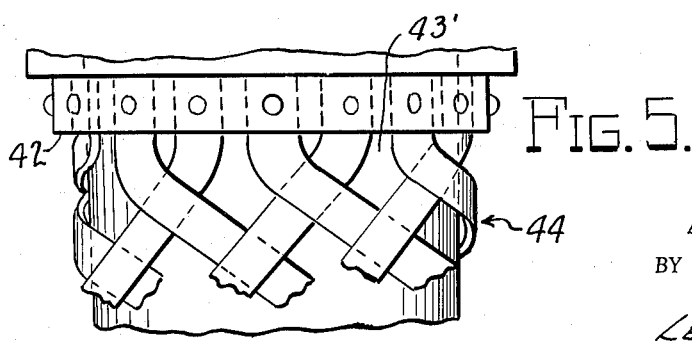
INVENTOR.
Bernard L. Steierman
BY
W. A. Schaich
Leonard D. Soubier
ATTORNEYS

United States Patent Office 2,981,975
Patented May 2, 1961

2,981,975
APPARATUS FOR SHAPING CYLINDRICAL STOCK

Bernard L. Steierman, Toledo, Ohio, assignor to Owens-Illinois Glass Company, a corporation of Ohio Filed Nov. 25, 1958, Ser. No. 777,541

16 Claims. (Cl. 18—19)

The present invention relates to the forming of rod and tube stock. The invention, relates to novel apparatus for carrying-out the method.

The formable materials of the type suited for shaping in accordance with this invention are conventionally formed by pressure extrusion or drawing, usually while in an induced plastic condition. The production of tube stock of predetermined diameter has been a long-standing problem. Heretofore, it has been customary to attempt to accurately control the size of the extruded or drawn tubular material during the operational stage of extrusion or drawing. This, however, has required the very careful control and balancing of a variety of factors which influence the size of the tube stock. Some of the factors which must be controlled and balanced are the rate of extrusion or drawing, the size and design of the extrusion die, the temperature of the extrusion die, the temperature of the material to be extruded or drawn, the plasticity or viscosity of the material to be extruded or drawn, and the rate of cooling or hardening of the formed tube or rod. The control and interbalancing of the above-recited factors have been extremely difficult to accomplish, and, in fact, have been to a large extent unsuccessful. Furthermore, tube stock shaped and sized as described above is additionally found to be possessed of surface flaws and irregularities which are obviously undesirable, particularly in the case of glass and similar materials.

Accordingly, it is an object of this invention to provide shaping and sizing apparatus for carrying-out a process, which, when practiced on formable cylindrical stock, substantially eliminates the foregoing problems.

It is a principal object of the present invention to provide apparatus for shaping cylindrical stock which furnishes products of uniform size.

It is also an object of this invention to provide apparatus which furnishes products free of surface defects.

It is another object of this invention to provide apparatus which is conducive to continuous operation, and, therefore, compatible with conventional continuous extrusion or draw processes.

It is likewise an object of this invention to provide apparatus which is capable of shaping a tube or rod of formable material and accurately sizing it to a preselected value of outside diameter.

It is another object of this invention to provide an apparatus which is capable of shaping tubular thermoplastic material in such a fashion that it is free from surface flaws and irregularities.

These and other objects of this invention will become apparent from the following detailed description, taken in conjunction with the annexed sheets of drawings, on which is presented for purposes of illustration only, several preferred embodiments of this invention.

In the drawings:

Fig. 1 is a side elevational view of an apparatus illustrating one embodiment of this invention.

Fig. 2 is a side elevational view of an apparatus illustrating another embodiment of this invention.

Fig. 3 is a sectional view taken on the line 3—3 of Fig. 2.

Fig. 4 is a schematic sectional view illustrating another embodiment of this invention.

Fig. 5 is an enlarged fragmentary plan view of one end of the apparatus of this invention.

Fig. 6 is a plan view of a modified form of construction representing a specific embodiment of this invention.

Fig. 7 is a sectional view taken on the line 7—7 of Fig. 6.

The invention in its most basic form envisions the conversion of a formable material into the shape of a cylinder or tube, maintaining the cylinder in formable condition, advancing said cylinder in generally axial fashion, and subjecting the surface of said cylinder to repeated, inwardly, radial contacts defining the ultimately desired size of the tube.

The invention also contemplates novel apparatus comprising a generally hollow tubular passageway to receive the formable rod or tubing, such passageway being defined by a web-like configuration of a plurality of flexible strips of a heat-stable material constructed and arranged in helical configuration, in conjunction with means for cyclically varying the effective diameter of the passageway.

Referring now more specifically to the drawings:

There is shown in Fig. 1, one form of apparatus for carrying out the method of the invention. The apparatus as shown rests on a table 10. A support pedestall 11 forms one end of the apparatus. The pedestal has an aperture therein defining a cylindrical passageway 12 for receiving a continuously advancing tube 13 of a formable material. Another pedestal member 14 forming the other end of the apparatus is positioned in spaced-apart relationship with respect to the pedestall 11 and contains an aperture defining a tubular passageway 15 in axial alignment with the passageway 12. An annular piston-like member 16 is snugly but slidably positioned within the passageway 15. The annular piston-like member 16 contains a cylindrical passageway 17, concentric to the passageway 15, through which the tube of formable material is withdrawn. One end of the piston-like member 16 extends beyond the pedestal 14 in the direction of the pedestall 11, defining an annular collar 18 fulfilling a purpose disclosed hereinafter. An annular flange 19 projects upwardly from the collar 18 and defines a seat 20 for an annular spring 21 positioned about the piston member 16 and contacting the vertical surface 22 of the pedestal 14, facing the pedestal 11. The action of the spring 21 against the annular flange 19 tends to urge the piston-like member 16 in the direction of the pedestal 11. The piston-like member 16 also contains an annular flange 23 at the end opposite the collar 18, the periphery 24 of which flange is in snug sliding contact with the inner cylindrical wall 25 formed by an annular cut-out at the rear of pedestal 14. The flange 23, in conjunction with the aforesaid cut-away section, defines an annular chamber 26. The inner cylindrical wall 25 of the cut-out in the pedestal 14 is fitted with a pair of spaced-apart annular stop rings 27 and 28 on either side of the flange 23, thereby serving to confine the linear path of the flange 23, consequently, of the piston member 16. The chamber 26 is connected by a conduit 29 to a cylindrical valve member 30, which valve member is, in turn, connected by conduit 31 to a source of pressure, and by conduit 32 to an exhaust. The cylindrical valve 30 contains an inner rotatable plug-like member 33 having a V-shaped cut-away 33' serving to connect the conduit 29 alternately to the exhaust conduit 32 and the pressure conduit 31 as the member 33 rotates. The plug 33 may be rotated by any conventional means such as an electric motor (not shown).

The pedestal 11 bears an integral annular flange 41 concentrically positioned about the passageway 12, and to which is rigidly affixed an annular collar 42. To the inner periphery of the annular collar 42 are rigidly attached a plurality of thin metal strips or bands 43. The strips, as shown, are conveniently held by rivets to the collar 42 and are uniformly and radially disposed thereon. The strips 43 extend from the collar 42 in helical fashion and are attached in a similar manner to the collar 18 of the plug member 16 slidably mounted in the pedestal 14. In the preferred form of this invention, as illustrated herein, adjacent strips, as attached on the collars, extend in opposite directions of spiral and are interwoven (Fig. 5) to form a generally tubular passageway 43', the wall 44 of which may be described as web-like.

To operate the apparatus, the plug-like member 33 is caused to rotate rapidly. This will cause the chamber 26 to be exposed alternately to a source of pressure and a source of exhaust. The pressure cycle will cause a force to be exerted against the flange 24, forcing the piston 16 rearwardly until the flange 24 hits the stop ring 28. At the same time, the flange 19 compresses the annular spring 21 against the surface 22 of the pedestal. The succeeding exhaust cycle releases the pressure within the chamber 26 and the compressed spring 21 will return to its normal position, forcing the piston 16 in the direction of the pedestal 11 until the flange 24 engages the stop ring 27. Repetition of the above-described cycles causes the piston-like member 16 to rapidly reciprocate or vibrate to and fro in axially linear motion. The linear motion of the piston 16 causes the ends of the strips 43, which are attached to the collar 18, to alternate between an extended position when the flange 24 abuts the stop ring 28, and a normal position when the flange 24 contacts the stop ring 27. The relative movement of the ends of the strips 43 in an axial direction effects a radial displacement of the wall of the passageway 43' formed by the interwoven strips. This motion may be conveniently described as an alternating contraction and relaxation. In contracting, the wall defines a smaller diameter than that defined when in a relaxed cycle. The tube 13 is conveniently introduced through the passageway 12, preferably when in the relaxed cycle, passes through the passageway defined by the webbed strips, and emerges from the passageway 17 in the piston-like member 16. As the tube is advanced slowly and continuously, the wall formed by the helical strips contracts to define the desired diameter, then relaxes to define a somewhat greater diameter. The tubular material will, of course, have been previously extruded or drawn into a tubular form having a diameter slightly larger than that defined by the wall during the contracting cycle and, consequently, the outer surface of the tubular material will be briefly and repeatedly contacted by the inner surfaces of the metal strips, which will exert a series of inwardly directed, radial forces on the circumferential area of the tube. The foregoing will effectively shape and size the tube as it passes therethrough. The tubular or rod-like material should be in a formable plastic state and may be, for instance, glass which has not yet hardened, and having, for example, a viscosity of about one million poises. Any formable material may be formed and sized in accordance with this invention, for instance, the rubber-like materials, both synthetic and natural; the synthetic resins, including the thermoplastic and thermosetting variety, of which the following are examples: the amino aldehyde resins, the phenolics, the polyesters, the cellulose resins, the epoxy resins, the vinyl resins, etc. Control of the extent of contraction of the wall formed of the metal strips is effectively provided by controlling the extent of the linear movement of the piston-like member 16, e.g., by proper location of the annular stop rings 27 and 28, and by control of the amount of pressure. The number of inwardly radial contacts per unit of time, is of course, dependent upon the frequency of the contracting and relaxing cycles, and is controlled by adjusting the speed of rotation (the revolutions per minute) of the plug-like member 33. Considering the foregoing, it may be readily appreciated that the diameter defined during the contracting cycle may be conveniently and accurately controlled.

Another embodiment of this invention is illustrated in Fig. 2, where there is shown a table 50 upon which is positioned a pedestal 51 of generally similar construction as that of pedestal 11 in Fig. 1. A pedestal 52 is positioned in spaced-apart relationship with respect to the pedestal 51. This pedestal contains an aperture 53 defining an inner cylindrical surface onto which is fitted a rotatable bushing 54, having spaced-apart flanges 55 and 55' abutting apposite faces of the pedestal 52 and preventing any linear movement of the bushing 54. An annular collar 56 is rigidly affixed to the bushing 54, on the side facing the pedestal 51, to which are riveted the ends of a plurality of strips 57 in a manner described hereinbefore in connection with Fig. 1. The other ends of the strips 57 are similarly affixed to a collar 58 rigidly affixed to an annular flange 59 on the pedestal 51. In this embodiment of the invention, the contraction and relaxing cycle described by the wall formed of the metal strips is effected by rotating one end thereof, namely, the collar 56, first in one direction, then in the other, in oscillating fashion. This oscillating, rotational movement is imparted by a rack and gear arrangement comprising a flange 59 on the bushing 54, provided with gear teeth 60 which are curvilinear and concentric with the bushing 54, and a rack 61 mating therewith and formed on the end of a vertical piston rod 62. The piston rod extends upwardly through an aperture 63 in a cylindrical chamber 64, and a piston 65 is affixed to the upper end thereof. The piston 65 divides the cylinder 64 into an upper compartment 66 and a lower compartment 67. Both of these chambers are connected, respectively, by conduits 68 and 69 to a valve 70 which, in turn, is connected by opposed conduits 71 and 72, respectively, to a source of pressure and an exhaust. The valve 70 contains a rotatable plug 73, the rotation of which serves to alternately connect the chambers 66 and 67 with the source of pressure, and contemporaneously expose the opposite chamber to the exhaust. The reciprocating vertical motion of the piston rod 62 causes the teeth of the rack 61 to engage the teeth 60 of the flange 59, and effects rotation of the collar 56, first in one direction and then in another. This, as indicated hereinbefore, effects a corresponding contracting and relaxing of the wall formed by the strips 57. The frequency of the motion may be conveniently controlled by regulating the speed of rotation of the plug 73. The degree of contraction can be conveniently controlled by regulating the extent of linear movement of the piston rod 62. A height-adjustable annular stop ring 74, positioned about the piston rod 62, readily provides this control. As can be appreciated, the gearing arrangement may be so adjusted that the normal relaxed position of the wall formed by the thin strips occurs at the midpoint of the rotation of the bushing in one direction. With this adjustment, a contracting (sizing) cycle of the wall will be induced at each end of the period of rotation, or, in other words, each stroke of the piston will effect two contracting cycles of the wall.

While the thin metal strips described hereinbefore may be satisfactory in the forming of materials which are formable, or plastic, at not too high temperatures, they may be unsatisfactory for the forming and sizing of materials which are plastic only at elevated temperatures, such as glass. For the materials having high solidifying temperatures, there is illustrated in Figs. 6 and 7, another embodiment of this invention. In this embodiment, a metal strip 81 is utilized; however, to one side is affixed, by a rivet 82, a block of carbon 83 or other high temperature-stable material having a low coefficient of moving friction. The blocks 83 may be formed to have a facing surface 84 which is concave to more closely approach the contour of the outer surface of the material to be shaped, and thus accomplish a greater effective area of contact between the block and the material to be shaped. Adjacent blocks on the same strip are displaced sufficiently to allow relative motion between the strips and, therefore, avoiding any interference with the contracting and relaxing cycles desired in order to effectively and accurately size the plastic material.

Fig. 4 illustrates the use of the apparatus of this invention in sizing a continuous length of hollow tubing 85. The surface of the tube, shown in cross-section, is contacted by the strips 86, pulsating between contacting and non-contacting relationship with said tube. As shown, the strips are in non-contacting relationship with said tube surface. Angular rotation of the collar 87 to which the ends of the strips are riveted will effect an inward, radial displacement of the strips to bring them into contacting relationship with the tube surface, and defining the desired diameter.

Circumferential cooling is conveniently and beneficially employed in the practice of this invention. One arrangement for this purpose is shown in Fig. 2, namely, a hollow ring 91 containing in its inner periphery 92, a plurality of apertures 93, and being connected by conduit 94 to a source of coolant medium. More than one such coolant ring may be called for under extreme conditions. Furthermore, the number of apertures, the size of apertures, the choice of coolant medium, and the location of the ring may be adjusted to fit the particular conditions involved with a particular drawn or extruded material. The discontinuous nature of the wall formed by the flexible strips readily permits flow of the coolant medium about the outer surface of the material and effects cooling of the material to its hardening temperature, as the accurate sizing afforded by the pulsating wall is completed.

The present application is a continuation in part of my copending application Serial No. 635,902, filed January 23, 1957, and now abandoned and entitled, "Apparatus for Shaping Tubular Plastic Material."

While the invention has been described with particular reference to certain embodiments for effecting movement of one end of apparatus having the ends of the flexible strips attached thereto, it is not intended to be limited solely thereto, inasmuch as there are other obvious expedients which may be resorted to in order to obtain the desired radial displacement of the strips into and out of shaping contact with the material to be shaped and sized. Thus, a hydraulic, steam, or combustible fuel-actuated piston arrangement can be utilized. Similarly, electricity can be used as a source of power, as, for instance, through a solenoid or other electro-magnetic vibration devices. Any of the foregoing, as well as other mechanical equivalents, can be conveniently adapted to practice the invention as described hereinabove. Accordingly, it is intended that such be considered within the spirit and scope of this invention, unless otherwise excluded by the following claims.

I claim:

1. Apparatus for shaping and sizing a continuously advancing tube of a formable material, which comprises a generally tube-shaped member adapted to surround said tube, said member including annular end portions, support means for maintaining said end portions in axial alignment and capable of relative axial and rotative movement, and an intermediate portion defined by a plurality of helical strips connecting said end portions, and means for imparting rapid, cyclic relative movement between said end portions, whereby said strips pulsate between shaping and non-shaping engagement with said tube.

2. Apparatus for shaping and sizing a continuously advancing tube of formable material, which comprises a pair of tube-encircling, annular members, support means for maintaining said annular members in axial alignment and capable of relative, axial and rotative movement, a plurality of strips of a heat-stable material connecting said members, each of said strips being constructed and arranged in the configuration of a helix intermediate said annular members, and motor means for imparting rapid reciprocating relative movement between said annular members, whereby said strips pulsate between contacting and non-contacting relationship with said tube.

3. Apparatus for shaping and sizing a continuously advancing tube of formable material, which comprises a pair of tube-encircling, annular members, support means for maintaining said annular members in axial alignment and capable of relative, axial and rotative movement, a plurality of strips of a heat-stable material connecting said members, each of said strips being constructed and arranged in the configuration of helices and in such fashion that adjacent strips describe opposite directions of spiral and are substantially uniformly interwoven, and motor means for imparting rapid reciprocating relative movement between said annular members.

4. Apparatus for shaping and sizing a continuously advancing tube of formable material, which comprises a pair of relatively movable, tube-encircling members in spaced-apart, axial alignment, a plurality of flexible strips connecting said members, each of said strips being constructed and arranged in the configuration of helices, a plurality of blocks of a heat-stable material carried on the said strips in inwardly facing relationship, and means for imparting relative reciprocating motion to said annular members.

5. Apparatus for shaping and sizing a continuously advancing tube of formable material, which comprises a pair of relatively movable, tube-encircling, annular members in spaced-apart alignment, a plurality of flexible strips connecting said members, each of said strips being constructed and arranged in the configuration of helices and in such fashion that adjacent strips describe opposite directions of spiral and are substantially uniformly interwoven, a plurality of blocks of a heat-stable material carried on the said strips in inwardly facing relationship, and means for imparting relative reciprocating motion to said annular members.

6. Apparatus for shaping and sizing a continuously advancing tube of heat-softened, thermoplastic material, which comprises a pair of relatively movable tube-encircling, annular members, support means for maintaining said annular members in axial alignment and capable of relative, axial and rotative movement, a plurality of strips of heat-stable material connecting said members, each of said strips being constructed and arranged in the configuration of a helix intermediate said annular members, and reciprocating motor means operatively connected to one of said tube-encircling members for imparting rapid, relative movement between said members.

7. Apparatus as claimed in claim 6, which additionally includes means for controlling the extent of said movement.

8. Apparatus as claimed in claim 6, which additionally includes means for controlling the frequency of said reciprocation.

9. Apparatus as claimed in claim 2, which includes means for controlling the extent of said movement for selectively controlling the increment of pulsation of said strips, and means controlling the frequency of said reciprocation.

10. Apparatus for shaping and sizing a continuously advancing tube of formable material, which comprises a pair of tube-encircling, annular members, support means for maintaining said annular members in axial alignment and capable of relative, axial and rotative movement, a plurality of strips of heat-stable material connecting said members, each of said strips being constructed and arranged in the configuration of a helix intermediate said annular members, said strips together defining a forming die, through which the tube advances, said die being variable in diameter into and out of shaping engagement with the tube in response to rapid, reciprocating relative movement of said annular members, and means for imparting rapid reciprocating relative movement between said annular members.

11. Apparatus for shaping and sizing a continuously advancing tube of formable material, which comprises a pair of tube-encircling, annular members, support means for maintaining said annular members in axial alignment and capable of relative, axial and rotative movement, a plurality of strips of a heat-stable material connecting said members, each of said strips being constructed and arranged in the configuration of helices and in such fashion that adjacent strips describe opposite directions of spiral and are substantially uniformly interwoven to define a forming die composed of a plurality of inwardly facing, material-contacting surfaces, said surfaces being movable between shaping and non-shaping contact with said advancing tube, responsive to relative movement of said annular members, and means for imparting rapid reciprocating relative movement between said annular members.

12. Shaping and sizing apparatus for formable tube stock, including a pair of annular members, a plurality of strips or bands of heat-stable material connecting said members and extending in helical fashion between them to define a forming passageway, support means carrying said annular members in axial alignment but in otherwise relatively movable relationship, said passageway being variable between shaping and non-shaping contact with said advancing tube responsive to movement of said annular members, and means for imparting rapid reciprocating relative movement between said annular members.

13. Apparatus for shaping and sizing formable, cylindrical stock, comprising a generally tubular passageway having relatively rigid, annular end portions, and an intermediate portion of cyclically variable diameter, support means for said end portions constructed and arranged to permit relative motion between said end portions and to hold same in axial alignment, said intermediate portion being composed of a plurality of strips of heat-stable material extending in helical fashion from one end portion to another and connected thereto, said strips being disposed to radial displacement, into and out of shaping contact with stock passed therethrough, responsive to rapid cyclic relative movement of said end portions, and means for imparting said movement.

14. Apparatus comprising a pair of spaced-apart pedestals provided with apertures in axial alignment, a bushing member slidably mounted in one of said apertures and having a collar portion extending axially beyond said aperture toward said opposite pedestal, said bushing member having a central aperture concentric to said apertures in said pedestals, a plurality of strips of heat-stable material attached to said collar portion extending in helical fashion to said other pedestal, and attached thereto in concentric relationship with the said aperture contained therein, said apertures and said strips defining a tubular passageway, the portion defined by said strips being radially displaceable, responsive to rotative movement of said bushing member, into and out of shaping contact with stock passed through said apparatus, stop means limiting the extent of rotative movement of said bushing member, and drive means for rotating said bushing in oscillating fashion.

15. Apparatus comprising a pair of spaced-apart pedestals provided with apertures in axial alignment, a piston-like member slidably mounted in one of said apertures and having a collar portion extending axially beyond said aperture toward said opposite pedestal, said piston-like member having a central aperture concentric to said aperture in said pedestals, a plurality of strips of heat-stable material attached to said collar portion extending in helical fashion to said other pedestal, and attached thereto in concentric relationship with the said aperture contained therein, said apertures and said strip defining a tubular passageway, the portion defined by said strips being radially displaceable, responsive to axial movement of said piston-like member, into and out of shaping contact with stock passed through said apparatus, stop means limiting the extent of axial movement of said piston-like member, spring means urging said piston-like member in one direction, and intermittent drive means urging said piston tube member in the opposite direction.

16. A variable diameter die for accurately sizing a continuously advancing tube of material capable of being shaped, said die including a pair of relatively movable, axially aligned, annular members connected by a web-like configuration of helically disposed, relatively movable bands of heat-stable material defining a forming die of predetermined diameter between said members, said bands being capable of contraction in response to relative movement of said annular members to define a forming die of predetermined smaller diameter than said first-mentioned forming die, said bands being capable of relaxing in response to reverse movement of said annular members to define said first-mentioned forming die, and means for relatively moving said annular members in a rapid reciprocating manner without disturbing the axial alignment.

References Cited in the file of this patent

UNITED STATES PATENTS

| | | |
|---|---|---|
| 1,731,988 | Skillman | Oct. 15, 1929 |
| 2,248,898 | Ross et al. | July 8, 1941 |
| 2,268,598 | Kellems | Jan. 6, 1942 |
| 2,290,199 | Moule | July 21, 1942 |
| 2,320,341 | Bowes | June 1, 1943 |
| 2,434,358 | Frank | Jan. 13, 1948 |
| 2,539,398 | Bowes | Jan. 30, 1951 |
| 2,717,474 | Barradell-Smith | Sept. 13, 1955 |
| 2,779,976 | Roberts et al. | Feb. 5, 1957 |
| 2,838,796 | Reed | June 17, 1958 |

UNITED STATES PATENT OFFICE

CERTIFICATE OF CORRECTION

Patent No. 2,980,975

April 25, 1961

Ernest E. Jones

It is hereby certified that error appears in the above numbered patent requiring correction and that the said Letters Patent should read as corrected below.

Column 3, lines 4, 5, and 6, for "thereby retaining the stud in a water-impervious state outwardly flared and in tight engagement with the circumferential shoulder portion of said head portion," read -- outwardly flared and in tight engagement with the circumferential shoulder portion of said head portion, thereby retaining the stud in a water-impervious state --.

Signed and sealed this 21st day of November 1961.

(SEAL)
Attest:

ERNEST W. SWIDER
Attesting Officer

DAVID L. LADD
Commissioner of Patents
USCOMM-DC